No. 827,495. PATENTED JULY 31, 1906.
H. A. ARVIG.
CREAMING CAN.
APPLICATION FILED MAY 14, 1906.
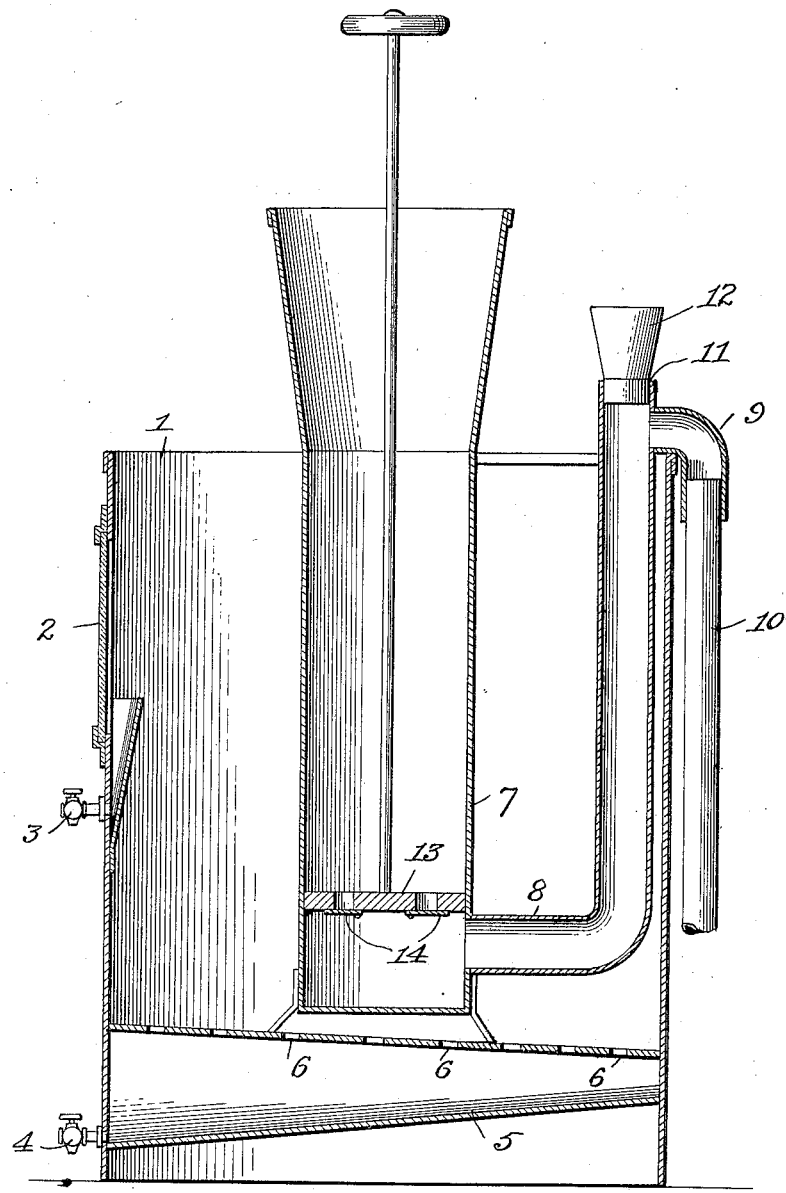
Witnesses
Edwin L. Yewell
C. D. Davis
Inventor
Hans A Arvig
By R. W. Bishof
Attorney

UNITED STATES PATENT OFFICE.

HANS A. ARVIG, OF PINE RIVER, MINNESOTA.

CREAMING-CAN.

No. 827,495.　　　Specification of Letters Patent.　　　Patented July 31, 1906.

Application filed May 14, 1906. Serial No. 316,817.

*To all whom it may concern:*

Be it known that I, HANS A. ARVIG, a citizen of the United States of America, residing at Pine River, in the county of Cass and State of Minnesota, have invented certain new and useful Improvements in Creaming-Cans, of which the following is such a full, clear, and exact description as will enable others skilled in the art to which it appertains to make and use the same.

This invention has for its object the provision of a cheap and simple device by the use of which freshly-drawn milk may be quickly lowered in temperature, so that the separation of the cream will be readily and rapidly accomplished.

With this object in view the invention consists in certain novel features of the device illustrated in the accompanying drawing, as will be hereinafter first fully described, and then particularly pointed out in the claims.

In the drawing I have shown a vertical sectional view of a creaming-can constructed in accordance with my invention.

The cylindrical vessel 1 receives the freshly-drawn milk and is provided on its side at any convenient point with a sight-glass 2, through which the level of the line of separation between the milk and the cream may be observed. At a proper height on its side the can or vessel 1 is provided with a cream-discharge faucet 3, and at its bottom it is provided with a milk-discharge faucet 4. In order that all the milk may be drawn from the can, a trough 5 leading to said faucet is provided on the under side of the bottom of the can, and the can-bottom is formed with a number of openings or perforations 6 over said trough. The trough, it will be observed, is inclined, so that all the milk will be caused to flow to the faucet. Within the vessel 1 I arrange the central water-cylinder 7, from the lower end of which is extended a pipe 8, which passes up to the top of the outer vessel and is there formed with an elbow 9, projecting over the edge of the said outer vessel. From the said elbow a pipe 10 may be carried to any convenient waste-receptacle. In the elbow 9 directly over the upwardly-extending branch of the pipe 8 is an opening 11, in which a plug 12 may be fitted. Within the water-cylinder 7 is fitted a plunger 13, having downwardly-opening valves 14, which plunger may, if desired, be connected to a windmill.

The construction of the device being thus made known, the operation and advantages of the same will be readily understood. The milk is poured into the outer vessel, and water is poured into the inner central cylinder. The water will pass up through the pipe 8 and the elbow 9, and thus escape, so that a circulation of the same will be effected when it is desired to drain the can, the pipes 8 and 10 and the elbow 9 acting as a siphon. If the plug 12 be removed, the siphon will be broken, and the water in the cylinder and pipe will then remain stationary and will lower the temperature of the same, and the heat will be drawn from the milk in contact therewith. As the temperature of the milk is lowered the cream will rise to the top of the same, and the progress of the separation may be observed through the sight-glass. The heat extracted from the milk will raise the temperature of the water, and the plunger is then inserted and reciprocated, so as to force out the warm water and draw into the central cylinder more cold water. This process is repeated until the cream has all been separated and risen to the top of the milk. The cream may be then drawn off through the cream-discharge faucet and the milk withdrawn from the milk-discharge faucet. When the piston is not connected to a windmill-pump, the plug 12 is inserted to reëstablish the siphon and drain the can of the warm water, fresh cold water being poured into the cylinder.

Having thus described my invention, what I claim, and desire to secure by Letters Patent, is—

1. In a creaming-can, a water-cylinder having a pipe leading upward from its lower end, said pipe being provided with an outwardly-projecting elbow having an opening in its upper side and a plug removably fitted in said opening.

2. The improved creaming-can herein described and shown, comprising an outer vessel provided with a cream-faucet on its side, a trough on its bottom, and a milk-faucet at the end of said trough, an inner cylinder, a pipe leading upward from the lower end of said cylinder, an elbow leading laterally from the upper end of said pipe and having an opening in its upper side over the pipe, and a plug removably fitted in said opening.

In testimony whereof I have signed this specification in the presence of two subscribing witnesses.

HANS A. ARVIG.

Witnesses:
F. L. HILL,
J. E. GEAREY.